US012671575B1

(12) United States Patent
Huang et al.

(10) Patent No.: US 12,671,575 B1
(45) Date of Patent: Jun. 30, 2026

(54) UNIVERSAL DISTRIBUTED KEY GENERATION ON TWO-PARTY COMPUTATION IN CRYPTOGRAPHIC NETWORKS

(71) Applicant: Circle Internet Group, Inc., New York, NY (US)

(72) Inventors: Huai Ting Huang, New Taipei City (TW); Vipin Singh Sehrawat, Fremont, CA (US); Chung-Tsai Su, New Taipei City (TW)

(73) Assignee: Circle Internet Group, Inc., New York, NY (US)

( * ) Notice: Subject to any disclaimer, the term of this patent is extended or adjusted under 35 U.S.C. 154(b) by 0 days.

(21) Appl. No.: 19/393,173

(22) Filed: Nov. 18, 2025

Related U.S. Application Data

(63) Continuation of application No. 19/233,958, filed on Jun. 10, 2025.

(51) Int. Cl.
| | |
|---|---|
| *H04L 29/06* | (2006.01) |
| *H04L 9/08* | (2006.01) |
| *H04L 9/32* | (2006.01) |

(52) U.S. Cl.
CPC .......... *H04L 9/0825* (2013.01); *H04L 9/3247* (2013.01)

(58) Field of Classification Search
CPC ........................... H04L 9/0825; H04L 9/3247
See application file for complete search history.

(56) References Cited

U.S. PATENT DOCUMENTS

| | | | |
|---|---|---|---|
| 10,903,991 B1* | 1/2021 | Craige | H04L 9/085 |
| 2002/0013898 A1* | 1/2002 | Sudia | G06Q 20/3829 |
| | | | 380/278 |
| 2007/0174618 A1* | 7/2007 | Nakano | H04L 9/30 |
| | | | 713/171 |
| 2018/0359097 A1* | 12/2018 | Lindell | H04L 9/3247 |
| 2025/0125972 A1* | 4/2025 | Pettit | H04L 9/3247 |

OTHER PUBLICATIONS

Kachouh et al. "Demystifying Threshold Elliptic Curve Digital Signature Algorithm for MultiParty Applications", ACSW '23: Proceedings of the 2023 Australasian Computer Science Week, pp. 112-121, Mar. 13 (Year: 2023).*
Subrahmanyam et al., "Authenticated Distributed Group Key Agreement Protocol Using Elliptic Curve Secret Sharing Scheme," in IEEE Access, vol. 11, pp. 45243-45254, (Year: 2023).*
Xue et al., "Efficient online-friendly two-party ECDSA signature," Proceedings of the 2021 ACM SIGSAC Conference on Computer and Communications Security, Virtual Conference, Nov. 12, 2021, pp. 558-573.

* cited by examiner

*Primary Examiner* — Morshed Mehedi
(74) *Attorney, Agent, or Firm* — Fish & Richardson P.C.

(57) ABSTRACT

Implementations of the present disclosure are directed to a universal distributed key generation (DKG) between computing devices for private key sharing in cryptographic networks. The universal DKG of the present disclosure overcomes deficiencies of traditional approaches to DKG in generating key pairs. The universal DKG provides time- and resource-efficient generation of cryptographic keys for multiple elliptic curves to enable entities to transact in multiple cryptographic networks. More particularly, the universal DKG simplifies management of cryptographic keys, while accelerating the key generation process without compromising security.

10 Claims, 3 Drawing Sheets

UNIVERSAL DISTRIBUTED KEY GENERATION ON TWO-PARTY COMPUTATION IN CRYPTOGRAPHIC NETWORKS

CROSS-REFERENCE TO RELATED APPLICATION(S)

This application is a continuation application of and claims the benefit of priority to U.S. application Ser. No. 19/233,958, filed on Jun. 10, 2025, the contents of which is hereby incorporated by reference.

TECHNICAL FIELD

This specification relates generally to distributed key generation and more particularly to universal distributed key generation for improved security and technical efficiency in cryptographic networks.

BACKGROUND

Cryptographic networks enable entities (e.g., enterprise, users) to securely exchange electronic communications. For example, cryptographic networks can use public-key cryptography to enable encrypted communications to be exchanged between entities. In general, public-key cryptography uses key-pairs that are generated using a cryptographic algorithm (e.g., using cryptographic pseudorandom number generators (CPRNG)), each key-pair including a public key and a private key. Each entity is assigned its own key-pair, where the public key is available to one or more other entities and the private key is held confidential to the respective entity.

In securing communications, entities use keys to generate signatures on encrypted information contained in exchanged messages. The signatures can be encrypted using asymmetric key encryption, which can include a sending entity generating a signature using a private key, which signature can be validated using the public key of the sending entity. As such, security is achieved through secrecy of the private key of the sending entity. That is, any entity that has access to the private key of the sending entity is able to generate signatures and act as the sending entity.

To enhance security, techniques such as multi-party computation (MPC) and threshold signature schemes (TSSs), have been introduced. MPC enables multiple entities to evaluate a computation without revealing any private data held by each entity. A TSS enables multiple entities to collectively sign publicly visible information without requiring a private key. Instead, in TSS, parties only compute with their respective private key share of the private key. That is, a threshold number of entities must participate to sign. In TSS, no single entity knows the (entire) private key. Instead, each entity knows the public key (shared public key) and holds an individual private key share that is a share (portion) of the private key (shared private key).

In TSS, each entity generates a partial signature and the partial signatures are aggregated to provide a final signature for the encrypted information. For TSS, distributed key generation (DKG) enables multiple entities to participate in generation of the key-pair (shared private key, shared public key). Through DKG, the shared public key is generated, which can be known to all entities, and multiple private key shares of a private key are generated, each private key share only being known to a respective entity of the multiple entities.

SUMMARY

This specification describes systems, methods, devices, and other techniques relating to distributed key generation (DKG) for improved security and technical efficiency in cryptographic networks. More particularly, implementations of the present disclosure are directed to universal DKG between two computing devices in cryptographic networks.

In general, innovative aspects of the subject matter described in this specification can include actions of defining a set of elliptic curves including two or more elliptic curves corresponding to a set of cryptographic networks, each elliptic curve being associated with a respective cryptographic network, receiving, by a first computing device, a first sub-set of parameters of a first set of parameters and a second sub-set of parameters of a second set of parameters generated by a second computing device using the set of elliptic curves, the first sub-set of parameters including a commitment and the second sub-set of parameters including a first verification value, determining, by the first computing device, a third set of parameters and a fourth set of parameters using the set of elliptic curves, transmitting, by the first computing device and to the second computing device, a third sub-set of parameters of the third set of parameters and a fourth sub-set of parameters of the fourth set of parameters, the third sub-set of parameters including a first set of public key shares and the fourth sub-set of parameters including a first set of verification parameters and a set of verification values, the first set of public key shares being generated by the first computing device using a first private key share, receiving, by the first computing device, a fifth sub-set of parameters of the first set of parameters and a sixth sub-set of parameters of the second set of parameters, the fifth sub-set of parameters including a second set of public key shares and the sixth sub-set of parameters including a second set of verification parameters and a second verification value, the second set of public key shares being generated by the second computing device using a second private key share, and determining, by the first computing device, a set of shared public keys, the first computing device using the first private key share to generate signatures in any of cryptographic network in the set of cryptographic networks. Other implementations of this aspect include corresponding systems, apparatus, and computer programs, configured to perform the actions of the methods, encoded on computer storage devices.

These and other implementations can each optionally include one or more of the following features: determining, by the first computing device, a set of shared public keys is executed in response to determining that a set of verifications is successful, the set of verifications being executed based on the fifth sub-set of parameters and the sixth sub-set of parameters; a verification in the set of verifications includes calculating, by the first computing device, an expected commitment and comparing the expected commitment to the commitment received from the second computing device; the second computing device transmits the fifth sub-set of parameters and the sixth sub-set of parameters in response to determining that a set of verifications is successful, the set of verifications being executed based on the third sub-set of parameters and the fourth sub-set of parameters; the second computing device uses the second private key share to generate signatures in any of cryptographic network in the set of cryptographic networks; actions further include generating, by the first computing device, a first partial signature in a first cryptographic network of the set of cryptographic networks using the first private key share, and generating, by the second computing device, a second partial signature in the first cryptographic network using the second private key share, the first partial signature and the second partial signature being combined within the first cryptographic network to provide a first signature; actions further include generating, by the first computing device, a third partial signature in a second cryptographic network of the set of cryptographic networks using the first private key share, and generating, by the second computing device, a fourth partial signature in the first cryptographic network using the second private key share, the third partial signature and the fourth partial signature being combined within the second cryptographic network to provide a second signature; the commitment is generated as a hash of the second set of public key shares; the first verification value is generated as a hash of the second set of public key shares and the second set of verification parameters; and a verification value of the set of verification values is generated as a hash of the first set of public key shares and the first set of verification parameters.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
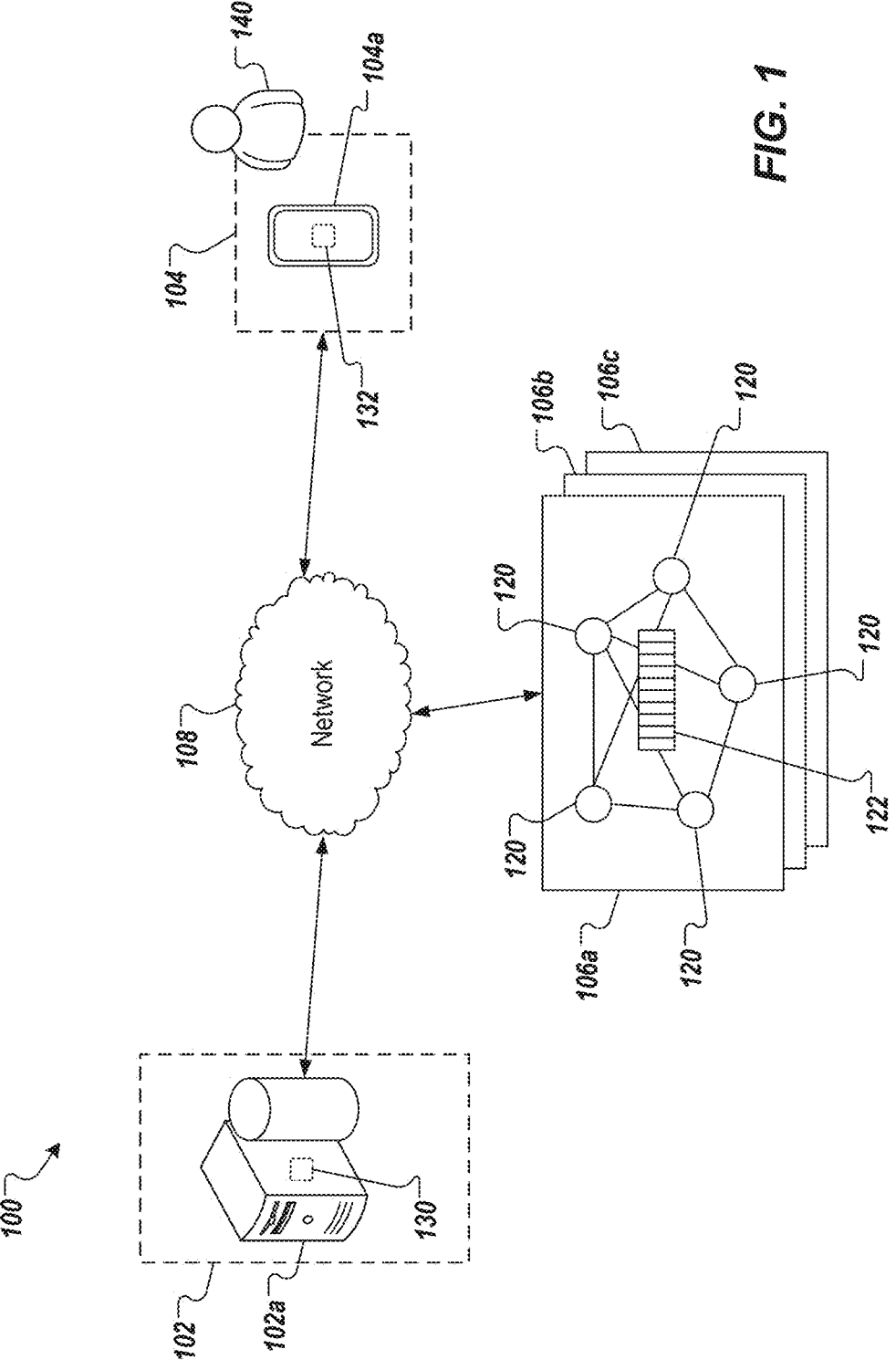
FIG. 1 is a conceptual architecture in accordance with implementations of the present disclosure.

This specification describes systems, methods, devices, and other techniques relating to distributed key generation (DKG) for improved security and technical efficiency in cryptographic networks. More particularly, implementations of the present disclosure are directed to universal DKG between two computing devices in cryptographic networks.

In some implementations, actions include defining a set of elliptic curves including two or more elliptic curves corresponding to a set of cryptographic networks, each elliptic curve being associated with a respective cryptographic network, receiving, by a first computing device, a first sub-set of parameters of a first set of parameters and a second sub-set of parameters of a second set of parameters generated by a second computing device using the set of elliptic curves, the first sub-set of parameters including a commitment and the second sub-set of parameters including a first verification value, determining, by the first computing device, a third set of parameters and a fourth set of parameters using the set of elliptic curves, transmitting, by the first computing device and to the second computing device, a third sub-set of parameters of the third set of parameters and a fourth sub-set of parameters of the fourth set of parameters, the third sub-set of parameters including a first set of public key shares and the fourth sub-set of parameters including a first set of verification parameters and a set of verification values, the first set of public key shares being generated by the first computing device using a first private key share, receiving, by the first computing device, a fifth sub-set of parameters of the first set of parameters and a sixth sub-set of parameters of the second set of parameters, the fifth sub-set of parameters including a second set of public key shares and the sixth sub-set of parameters including a second set of verification parameters and a second verification value, the second set of public key shares being generated by the second computing device using a second private key share, and determining, by the first computing device, a set of shared public keys, the first computing device using the first private key share to generate signatures in any of cryptographic network in the set of cryptographic networks.

Implementations of the present disclosure are described in further detail with non-limiting reference to an example use case. The example use case includes a cryptographic network that enables generation and storage of, and transactions related to digital assets, such as cryptocurrencies. For example, a cryptocurrency network can enable creation of tokens of a cryptocurrency that can be transferred between entities through transactions. In such cryptocurrency networks, transactions (e.g., creation, transfer) are immutably recorded in a distributed ledger, commonly referred to as a blockchain. While cryptocurrency networks are referenced herein, it is contemplated that implementations of the present disclosure can be realized for any appropriate cryptographic network for any appropriate use case.

With regard to cryptocurrency networks, users (entities) can hold digital assets as stores of value and mediums of exchange. In general, a digital asset can be described as a virtual store of value that leverages a peer-to-peer network to store, record, and validate transactions. A provider (entity) of the digital asset generates (which can be referred to as minting) tokens of the digital asset. The peer-to-peer network can maintain a distributed ledger (e.g., blockchain), which can be described as a decentralized database that immutably stores transactions across the peer-to-peer network. Example digital assets can include, without limitation, cryptocurrencies (e.g., stablecoins), non-fungible tokens (NFTs), security tokens, tokenized money market funds (T-MMF), and the like (e.g., government obligations).

Implementations of the present disclosure are described in further detail with non-limiting reference to cryptocurrency, among other digital assets. In some examples, a cryptocurrency can be described as a digital currency that uses cryptography to secure transactions that are recorded in the distributed ledger (e.g., blockchain). In some examples, a digital token (also referred to as a token) can be described as immutable, computer-readable code that represents an increment of a digital asset and is stored in the distributed ledger.

Implementations of the present disclosure are described in further detail herein with reference to example peer-to-peer networks (also referred to herein as chain networks and/or cryptocurrency networks), each maintaining a respective chain (distributed ledger, blockchain). Some example peer-to-peer networks can each be described as an Ethereum-compatible network. Ethereum can be described as a decentralized computing infrastructure that executes a virtual machine, referred to as the Ethereum virtual machine (EVM), to execute transactions on a chain. The EVM can be described as a global singleton and operates as a single-instance computer, globally across nodes of the peer-to-peer network. That is, each node in the network executes a local copy of the EVM to execute transactions on the chain. The chain of the peer-to-peer network records the changing state of the EVM as transactions are processed. While Ethereum is referenced herein for purposes of illustration, it is contemplated that implementations of the present disclosure can be realized using any appropriate peer-to-peer network (e.g., networks that provide on-chain computing; EVM-compatible chains). Example peer-to-peer networks can include, without limitation, Arbitrum, Avalanche, and Base, among several others, each of which is EVM-compatible. It is contemplated, however, that implementations of the present disclosure can be realized in peer-to-peer networks that are not EVM-compatible.

In general, tokens of a digital asset can be generated using a minting process. Minting can generally be described as generating tokens of a digital asset through execution of cryptographic transactions within a network and recording the transactions in a blockchain maintained within the network. In some examples, minting is executed through a minting function of a smart contract (minter) that is executed within the network. On the other hand, tokens of a cryptocurrency can be permanently removed from circulation within a network using a burning process. Burning can generally be described as permanently removing tokens of a cryptocurrency from circulation through execution of cryptographic transactions within a network and recording the transactions in a blockchain maintained within the network. In some examples, burning is executed through a burning function of a smart contract (burner) that is executed within the network. Smart contracts can be described as programs that are executed on-chain and are each provided as a collection of code (functions) and data (state) that resides at a specific address on the chain.

To provide context for the subject matter of the present disclosure, and as introduced above, cryptographic networks, such as cryptocurrency networks, enable entities (e.g., enterprise, users) to securely exchange electronic communications and execute transactions. For example, cryptographic networks can use public-key cryptography to enable encrypted communications to be exchanged between entities. In general, public-key cryptography uses key-pairs that are generated using a cryptographic algorithm (e.g., using cryptographic pseudorandom number generators (CPRNG)), each key-pair including a public key and a private key. Each entity is assigned its own key-pair, where the public key is available to one or more other entities and the private key is held confidential to the respective entity.

To enhance security, techniques such as multi-party computation (MPC) and threshold signature scheme (TSSs), have been introduced. MPC enables multiple entities to evaluate a computation without revealing any private data held by each entity. A threshold signature scheme (TSS) enables multiple entities to collectively sign publicly viewable information. That is, a threshold number of entities must participate to sign the information. Typical approaches use a 2-out-of-3 threshold, meaning that at least two of three entities are needed to participate. In TSS, no single entity knows the private key. Instead, each entity knows the public key (shared public key) and holds an individual secret key share that is a share (portion) of the private key (shared private key). In TSS, each entity generates a partial signature and the partial signatures are aggregated to provide a final signature for the encrypted information.

For TSS, DKG enables multiple entities to participate in generation of the key-pair. Through DKG, the shared public key is generated, which can be known to all entities, and multiple shares of a private key, referred to as private key shares, are generated, each private key share only being known to a respective entity of the multiple entities.

Entities, however, can execute transactions on multiple, disparate cryptographic networks. Traditionally, for each cryptographic network, the entities require respective public-private key pairs (e.g., a shared private key and a shared public key for each cryptographic network). For example, distributed ledger technology is widely adopted in both cryptocurrency and decentralized finance (DeFi) applications, with over 10,000 cryptocurrencies available across multiple cryptocurrency marketplaces. Moreover, there is a growing number of distributed ledgers (blockchains), each possessing its unique market positioning based on distinctive technologies including technologies used for key-pair generation, such as in DKG.

For example, and as described in further detail herein, cryptographic keys are generated using defined elliptic curves, different cryptographic networks using different elliptic curves. Table 1, below, provides examples of different cryptographic networks and respective elliptic curves.

TABLE 1

| Example Cryptographic Networks and Elliptic Curves | |
|---|---|
| Elliptic Curve Name | Cryptographic Networks |
| secp256k1 | Bitcoin, Ethereum |
| Ed25519 | Cardano, Solana, Monero |
| secp256r1 (P-256) | Hyperledger Fabric |
| BLS12-381 | Ethereum 2.0, Chia, Dfinity |
| BN254 (alt_bn128) | Ethereum (zk-SNARK precompiles) |
| secp384r1 | Hyperledger Fabric (alternative option) |
| Ed448-Goldilocks | Experimental Blockchain Prototypes |
| BLS12-377 | Experimental Aggregate Signature Schemes |
| Ristretto/Decaf | Experimental Privacy Protocols |

Accordingly, if entities would like to transact in the Bitcoin network, first cryptographic keys are generated using secp256k1, and would also like to interact in Solana, second cryptographic keys are generated using Ed25519.

In further detail, an enterprise (e.g., a minting entity) can provide a wallet infrastructure to users that enables the users to store cryptographic keys (e.g., for MPC with the enterprise). For example, a user can establish a wallet with the enterprise, the wallet storing the cryptographic keys of the user for executing transactions with the enterprise. If enterprises are to interact with users across multiple cryptographic networks, the wallet infrastructure can be required to support separate wallets, a wallet for each cryptographic network, particularly if the cryptographic networks employ different elliptic curves for key generation.

In MPC scenarios, such as two-party computation (2PC), cryptographic keys can be generated using a DKG protocol. An example DKG protocol includes the XAX+21 protocol, which is detailed in *Efficient Online-friendly Two-Party ECDSA Signature*, Xue et al. (2021) and is recognized as a state-of-the-art solution in terms of efficiency and flexibility.

The XAX+21 protocol includes three rounds of communication between entities (e.g., user, enterprise) to generate keys for a cryptographic network using a respective elliptic curve. Here, rounds of communication include non-interactive zero-knowledge (NIZK) proofs being included in the payloads. However, supporting multiple cryptographic networks multiplies the number of rounds of communication between entities and multiplies the number of keys generated. This results in linear growth in the number of rounds of communication, as more cryptographic networks are added. For example, using the XAX+21 protocol, if three cryptographic networks are to be supported, nine rounds of communication would be required, and six private key shares must be secured (e.g., three private key shares of the user, three private key shares of the enterprise). This is inefficient in terms of time and technical resources consumed (processing, memory, bandwidth).

In view of the foregoing, implementations of the present disclosure provide a universal DKG between computing devices for private key sharing in cryptographic networks. As described in further detail herein, the universal DKG of the present disclosure overcomes deficiencies of traditional approaches to DKG in generating key pairs. As described in further detail herein, implementations of the present disclosure provide time- and resource-efficient generation of cryptographic keys for multiple elliptic curves to enable entities to transact in multiple cryptographic networks. More particularly, implementations of the present disclosure simplify management of cryptographic keys, while accelerating the key generation process without compromising security. As described in further detail herein, implementations of the present disclosure minimize the number of communication rounds between entities, minimize the size of the communication payload involved in the key generation process, and decrease the computational load associated with point generation on elliptic curves and proof generation.

FIG. 1 depicts an example environment 100 that can be used to execute implementations of the present disclosure. In some examples, the example environment 100 enables entities to participate in two or more cryptographic networks for secure communications. The example environment 100 includes a provider system 102, a user system 104, multiple cryptographic networks 106a, 106b, 106c, and a network 108. In some examples, the network 108 includes a local area network (LAN), a wide area network (WAN), the Internet, or a combination thereof, and connects web sites, user devices (e.g., computing devices), and back-end systems. In some examples, the network 108 can be accessed over a wired and/or a wireless communications link.

In the example use case, the cryptographic networks 106a, 106b, 106c can be provided as cryptocurrency networks that enable one or more providers of cryptocurrencies (referred to herein as minting entities) to distribute tokens of cryptocurrencies to users and that enable users to execute transactions related to the cryptocurrencies. The cryptographic networks 106a, 106b, 106c can each be described as a peer-to-peer network that uses respective elliptic curves $G_1$, $G_2$, $G_3$ to generate cryptographic keys. For example, the cryptographic network 106a is a peer-to-peer network of nodes 120 and transactions related to the cryptocurrencies are immutably stored within a blockchain 122. The blockchain 122 is a distributed ledger that is updated and stored across multiple nodes within the cryptographic network 106a. The cryptographic networks 106b, 106c can be similarly constructed. Although the cryptographic networks 106a, 106b, 106c are each depicted separately from the network 108, it is contemplated that at least a portion of one or more of the cryptographic networks 106a, 106b, 106c can be provided within the network 108 (e.g., as nodes that are distributed across the Internet).

In the depicted example, the provider system 102 includes a computing device 102a, which can, for example, represent one or more servers. In some examples, the computing device 102a is operated by a minting entity to mint tokens of a cryptocurrency and distribute tokens to users, as well as execute transactions. Actions executed by the minting entity are recorded in the blockchain 122 of the cryptographic network 106a, for example. In some examples, the computing device 102a can function as a node of the cryptographic network 106a (and the cryptographic networks 106b, 106c). In the example of FIG. 1, the computing device 102a includes a trusted execution environment (TEE) 130. At a high-level, a TEE is a trusted environment within hardware (one or more processors, memory) that is isolated from the hardware's operating environment (e.g., operating system (OS), basic input/output system (BIOS)).

In the depicted example, the user system 104 includes a computing device 104a. In some examples, the computing device 104a can include, without limitation, a server, a desktop computer, a laptop computer, a tablet computing device, and a smartphone. In the example of FIG. 1, the computing device 104a includes a TEE 132. In some implementations, a user 140 uses the computing device 104a to execute transactions within the cryptographic networks 106a, 106b, 106c. For example, transactions executed in the cryptographic network 106a are immutably recorded in the blockchain 120. Example transactions can include, without limitation, purchasing tokens of a cryptocurrency from the minting entity and transferring tokens of cryptocurrency with other users and/or the minting entity.

In order to enable the provider system 102 and the user system 104 to cryptographically interact in the cryptographic networks 106a, 106b, 106c (e.g., execute cryptocurrency transactions), key pairs are required for each cryptographic network 106a, 106b, 106c. As described in further detail herein, the multiple key pairs (i.e., a key pair for each of the cryptographic networks 106a, 106b, 106c) can be generated using the universal DKG of the present disclosure. For example, the universal DKG protocol of the present disclosure takes place between a first party $P_a$ (e.g., a computing device operated by a minting entity) and a second party $P_b$ (e.g., a computing device operated by a user that transacts tokens minted by the minting entity). In the example of FIG. 1, the first party $P_a$ can be the computing device 102a operated by the minting entity and the second party $P_b$ can be the computing device 104a of the user 140.

In further detail, and as introduced above, the universal DKG of the present disclosure improves the efficiency of key pair generation and security of wallets (MPC wallets) by unifying DKG. This includes, as described in further detail herein, multiple key pairs being concurrently generated using multiple, disparate elliptic curves (e.g., $G_1, \ldots, G_m$). As such, multiple secure wallets (MPC wallets) are provided, each compatible with a non-isomorphic, unique elliptic curve.

In some implementations, the universal DKG of the present disclosure uses discrete-logarithm equivalence (DLEQ) to ensure that each party follows the protocol as expected. In general, DLEQ can be used to prove two points on an elliptic curve were both derived from the same private value (such as a private key). As described in further detail herein, the universal DKG of the present disclosure applies a heuristic, such as the Fiat-Shamir Heuristic, to make DLEQ non-interactive (NI).

The universal DKG of the present disclosure can be executed to generate m wallets (i.e., m key pairs) for m distinct and non-isomorphic elliptic curves $G_1, \ldots, G_m$ that correspond to m distinct blockchains (cryptographic networks). As a point of terminology, in the context of elliptic curve cryptography (ECC), $G_i$ is a specific point on an $i^{th}$ elliptic curve that serves as a generator for points on the $i^{th}$ elliptic curve. In some examples, $n_i$ represents the order of the elliptic curve $G_i$, $\forall i \in [m]$ and $q=F(n_1, \ldots, n_m)$, where F is a user-defined function (e.g., least common multiple (LCM), maximum (MAX), minimum (MIN)). Use of the user-defined function enables adjustment of the security guarantee, while also reducing the risk of collisions and mitigating biases in the distribution of secrets.

Figure 2:
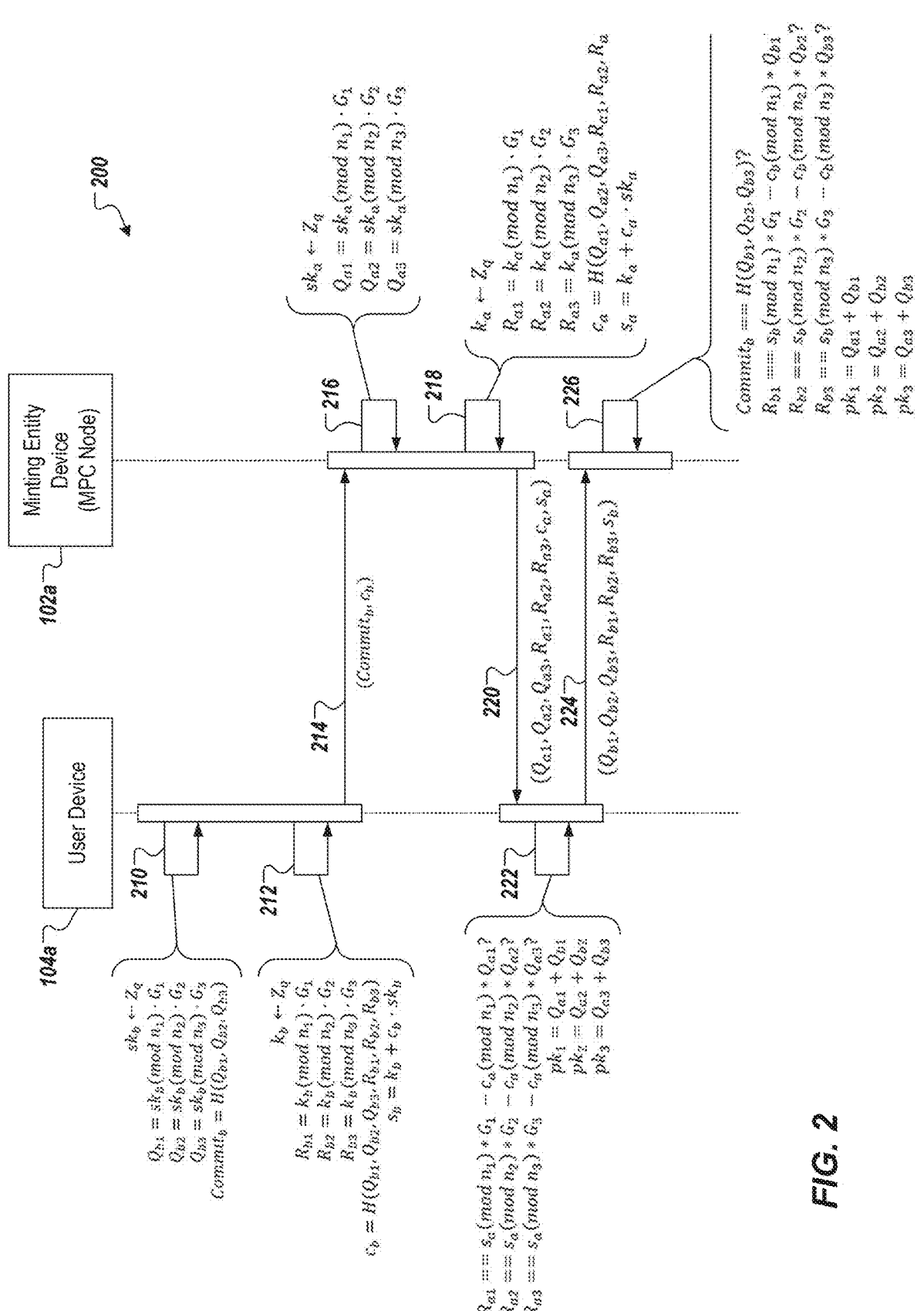
FIG. 2 is an example signal flow diagram in accordance with implementations of the present disclosure.

Details of the universal DKG of the present disclosure are described in further detail with reference to FIG. 2, which is an example signal flow diagram 200 in accordance with implementations of the present disclosure. In the example of FIG. 2, the computing device 104a and the computing device 102a are provided as the first party $P_a$ and the second party $P_b$, respectively. In the example of FIG. 2, m is equal to three (3) indicating that three key pairs (secure wallets) are to be generated for three elliptic curves $G_1$, $G_2$, $G_3$. It is contemplated, however, that implementations of the present disclosure can be realized for any appropriate value of m.

In some implementations, the second party $P_b$ initiates execution of the universal DKG. For example, and with reference to FIG. 1, the user 140 can use the computing device 104a to communicate with the computing device 102a to request the generation of a set of secure wallets (e.g., m=3 secure wallets) for use to execute cryptographic transactions with the minting entity across the cryptographic networks 106a, 106b, 106c. In some examples, the user can select which cryptographic networks that the set of secure wallets is to be generated for. For example, a user interface (UI) can be provided that enables the user to provide an indication as to which cryptographic networks are to have key pairs generated. In the example use case, the UI can display a superset of cryptocurrencies and the user can select a set of cryptocurrencies from the superset of cryptocurrencies. The set of secure wallets corresponds to the cryptographic networks underlying the set of cryptocurrencies.

Referring to FIG. 2, the second party $P_b$ (the computing device 104a) executes (210) a first set of computations to provide a first set of parameters. For example, the second party $P_b$ (randomly) samples $sk_b$ from $Z_q$ ($sk_b < Z_q$), where $sk_b$ is a private key share of the second party $P_b$, and $Z_q$ indicates integer mod q. Further, the second party $P_b$ determines a public key share $Q_{bi}$ for each cryptographic network. In some examples:

$$Q_{bi}=sk_b (\bmod\ n_i) \cdot G_i, \forall i \in [m]$$

where $n_i$ is the order of the $i^{th}$ elliptic curve. Accordingly, when m=3, the second party $P_b$ determines a set of public key shares as:

$$Q_{b1} = sk_b (\bmod\ n_1) \cdot G_1$$

$$Q_{b2} = sk_b (\bmod\ n_2) \cdot G_2$$

$$Q_{b3} = sk_b (\bmod\ n_3) \cdot G_3$$

The second party $P_b$ uses a hash function H (e.g., SHA256, SHA512) to generate a commitment $Commit_b$. For example:

$$Commit_b=H(Q_{b1},Q_{b2},\ldots,Q_{bm})$$

Accordingly, when m=3, the second party $P_b$ determines $Commit_b$ as:

$$Commit_b=H(Q_{b1},Q_{b2},Q_{b3})$$

Accordingly, the first set of parameters include key parameters and a commitment. When m=3, the first set of parameters is provided as:

$$sk_b,Q_{b1},Q_{b2},Q_{b3},Commit_b$$

The second party $P_b$ (the computing device 104a) executes (212) a second set of computations to provide a second set of parameters. For example, the second party $P_b$ (randomly) samples $k_b$ from $Z_q$ ($k_b \leftarrow Z_q$), where $k_b$ is a private nonce (random number) of the second party $P_b$. Further, the second party $P_b$ determines a verification parameter $R_{bi}$ for each cryptographic network. In some examples:

$$R_{bi}=k_b (\bmod\ n_i) \cdot G_i, \forall i \in [m]$$

Accordingly, when m=3, the second party $P_b$ determines a set of verification parameters as:

$$R_{b1} = k_b (\bmod\ n_1) \cdot G_1$$

$$R_{b2} = k_b (\bmod\ n_2) \cdot G_2$$

$$R_{b3} = k_b (\bmod\ n_3) \cdot G_3$$

The second party $P_b$ uses the hash function H to generate a first verification value $c_b$. For example:

$$c_b=H(Q_{b1},Q_{b2},\ldots,Q_{bm},R_{b1},R_{b2},\ldots,R_{bm})$$

Accordingly, when m=3, the second party $P_b$ determines cp as:

$$c_b=H(Q_{b1},Q_{b2},Q_{b3},R_{b1},R_{b2},R_{b3})$$

The second party $P_b$ generates a second verification value Sp. For example:

$$s_b=k_b+c_b \cdot sk_b$$

Accordingly, the second set of parameters includes verification parameters and verification values. When m=3, the second set of parameters is provided as:

$$k_b,R_{b1},R_{b2},R_{b3},c_b,s_b$$

The second party $P_b$ sends (214) $Commit_b$ and $c_b$ to the first party $P_a$ (the computing device 102a).

In response to receiving $Commit_b$ and $c_b$, the first party $P_a$ (the computing device 102a) executes (216) a third set of computations to provide a third set of parameters. For example, the first party $P_a$ (randomly) samples $sk_a$ from $Z_q$ ($sk_a \leftarrow Z_q$), where $sk_a$ is a private key share of the first party $P_a$. Further, the first party $P_a$ determines a public key share $Q_{ai}$ for each cryptographic network. In some examples:

$$Q_{ai}=sk_a (\bmod\ n_i) \cdot G_i, \forall i \in [m]$$

Accordingly, when m=3, the first party $P_a$ determines a set of public key shares as:

$$Q_{a1} = sk_a (\bmod\ n_1) \cdot G_1$$

$$Q_{a2} = sk_a (\bmod\ n_2) \cdot G_2$$

$$Q_{a3} = sk_a (\bmod\ n_3) \cdot G_3$$

The first party $P_a$ executes (218) a fourth set of computations to provide a fourth set of parameters. For example, the first party $P_a$ (randomly) samples $k_a$ from $Z_q$ ($k_a \leftarrow Z_q$), where $k_a$ is a private nonce (random number) of the first party $P_a$. Further, the first party $P_a$ determines a verification parameter $R_{ai}$ for each cryptographic network. In some examples:

$$R_{ai} = k_a (\text{mod } n_i) \cdot G_i \, \forall i \in [m]$$

Accordingly, when m=3, the first party $P_a$ determines a set of verification parameters as:

$$R_{a1} = k_a (\text{mod } n_1) \cdot G_1$$
$$R_{a2} = k_a (\text{mod } n_2) \cdot G_2$$
$$R_{a3} = k_a (\text{mod } n_3) \cdot G_3$$

The first party $P_a$ uses the hash function H to generate a third verification value $c_a$. For example:

$$c_a = H(Q_{a1}, Q_{a2}, \ldots, Q_{am}, R_{a1}, R_{a2}, \ldots, R_{am})$$

Accordingly, when m=3, the first party $P_a$ determines $c_a$ as:

$$c_a = H(Q_{a1}, Q_{a2}, Q_{a3}, R_{a1}, R_{a2}, R_{a3})$$

The first party $P_a$ generates a fourth verification value $s_a$. For example:

$$s_a = k_a + c_a \cdot sk_a$$

Accordingly, the fourth set of parameters includes verification parameters and verification values. When m=3, the fourth set of parameters is provided as:

$$k_a, R_{a1}, R_{a2}, R_{a3}, c_a, s_a$$

The first party $P_a$ sends (220) $Q_{a1}, \ldots, Q_{am}, R_{a1}, \ldots, R_{am}, c_a$, and $s_a$ to the second party $P_b$. When m=3, the first party $P_a$ sends $Q_{a1}, Q_{a2}, Q_{a3}, R_{a1}, R_{a2}, R_{a3}$ $c_a$, and $s_a$ to the second party $P_b$.

In response to receiving $Q_{a1}, \ldots, Q_{am}, R_{a1}, \ldots, R_{am}$, $c_a$, and $s_a$ from the first party $P_a$, the second party $P_b$ executes (222) a fifth set of computations to perform verifications and, if each verification succeeds, determine a set of public keys. In some examples, the second party $P_b$ verifies whether:

$$R_{ai} == s_a (\text{mod } n_i) * G_i - c_a (\text{mod } n_i) * Q_{ai}$$

Here, $R_{ai}$ was received from the first party $P_a$ and $s_a (\text{mod } n_i) * G_i - c_a (\text{mod } n_i) * Q_{ai}$ is computed by the second party $P_b$ as an expected verification parameter. Accordingly, when m=3, the second party $P_b$ verifies whether:

$$R_{a1} == s_a (\text{mod } n_1) * G_1 - c_a (\text{mod } n_1) * Q_{a1}$$
$$R_{a2} == s_a (\text{mod } n_2) * G_2 - c_a (\text{mod } n_2) * Q_{a2}$$
$$R_{a3} == s_a (\text{mod } n_3) * G_3 - c_a (\text{mod } n_3) * Q_{a3}$$

If any verification fails, the universal DKG process fails. If all of the verifications succeed, the second party $P_b$ calculates shared public keys $PK_1, \ldots, PK_m$ for the cryptographic networks, each shared public key corresponding to a respective cryptographic network. For example:

$$PK_i = Q_{ai} + Q_{bi}$$

When m=3, a set of shared public keys is provided as $PK_1$, $PK_2$, $PK_3$. Also in response to all of the verifications succeeding, the second party $P_b$ sends (224) $Q_{b1}, \ldots, Q_{bm}$ and $R_{b1}, \ldots, R_{bm}$ to the first party $P_a$. In some examples, by receiving $Q_{b1}, \ldots, Q_{bm}$ and $R_{b1}, \ldots, R_{bm}$ from the second party $P_b$, the first party $P_a$ is informed that the verifications performed by the second party $P_b$ succeeded. When m=3, the second party $P_b$ sends $Q_{b1}, Q_{b2}, Q_{b3}, R_{b1}, R_{b2}$, and $R_{b3}$ to the first party $P_a$.

In response to receiving $Q_{b1}, \ldots, Q_{bm}$ and $R_{b1}, \ldots, R_{bm}$ from the second party $P_b$, the first party $P_a$ executes (226) a sixth set of computations to perform verifications and, if each verification succeeds, determines a set of public keys. In some examples, the first party $P_a$ also verifies whether:

$$\text{Commit}_b = H(Q_{b1}, \ldots, Q_{bm})$$

Here, $\text{Commit}_b$ was received from the second party $P_b$ and $H(Q_{b1}, \ldots, Q_{bm})$ is computed by the first party $P_a$ as an expected commitment. Accordingly, when m=3, the first party $P_a$ verifies whether:

$$\text{Commit}_b = H(Q_{b1}, Q_{b2}, Q_{b3})$$

In some examples, the first party $P_a$ also verifies whether:

$$R_{bi} == s_b (\text{mod } n_i) * G_i - c_b (\text{mod } n_i) * Q_{bi}$$

Here, $R_{bi}$ was received from the second party $P_b$ and $s_b (\text{mod } n_i) * G_i - c_b (\text{mod } n_i) * Q_{bi}$ is computed by the first party $P_a$ as an expected verification parameter. Accordingly, when m=3, the first party $P_a$ verifies whether:

$$R_{b1} == s_b (\text{mod } n_1) * G_1 - c_b (\text{mod } n_1) * Q_{b1}$$
$$R_{b2} == s_b (\text{mod } n_2) * G_2 - c_b (\text{mod } n_2) * Q_{b2}$$
$$R_{b3} == s_b (\text{mod } n_3) * G_3 - c_b (\text{mod } n_3) * Q_{b3}$$

If any verification fails, the universal DKG process fails. If all of the verifications succeed, the first party $P_a$ calculates the shared public keys $PK_1, \ldots, PK_m$ for the cryptographic networks. For example:

$$PK_i = Q_{ai} + Q_{bi}$$

When m=3, the set of shared public keys is provided as $PK_1$, $PK_2$, $PK_3$.

If the universal DKG succeeds, the first party $P_a$ has the private key share $sk_a$, the second party $P_b$ has the private key share $sk_b$, and both the first party $P_a$ and the second party $P_b$ both have the set of shared public keys $PK_1, \ldots, PK_m$. Consequently, the first party $P_a$ and the second party $P_b$ can cooperatively conduct transactions in each of the cryptographic networks, such as MPC. More particularly, the first party $P_a$ can use the private key share $sk_a$ to generate signatures in any of the cryptographic networks, and the second party $P_b$ can use the private key share sky to generate signatures in any of the cryptographic networks. The first party $P_a$ and the second party $P_b$ can use the shared public keys $PK_1, \ldots, PK_m$ to authenticate signatures in the respective cryptographic networks.

In further detail, and with reference to the non-limiting example of FIG. 1, the shared public key $PK_1$ can correspond to the cryptographic network 106a, the shared public key $PK_2$ can correspond to the cryptographic network 106b, and the shared public key $PK_3$ can correspond to the cryptographic network 106c. In the cryptographic network 106a, the first party $P_a$ can use the private key share $sk_a$ to generate signatures, the second party $P_b$ can use the private key share sky to generate signatures, and the first party $P_a$ and the second party $P_b$ can each use the shared public key $PK_1$ to validate signatures of the other of the first party $P_a$ and the second party $P_b$. In the cryptographic network 106b, the first party $P_a$ can use the private key share $sk_a$ to generate signatures, the second party $P_b$ can use the private key share sky to generate signatures, and the first party $P_a$ and the second party $P_b$ can each use the shared public key $PK_2$ to validate signatures of the other of the first party $P_a$ and the second party $P_b$. In the cryptographic network $106a$, the first party $P_a$ can use the private key share $sk_a$ to generate signatures, the second party $P_b$ can use the private key share sky to generate signatures, and the first party $P_a$ and the second party $P_b$ can each use the shared public key $PK_3$ to validate signatures of the other of the first party $P_a$ and the second party $P_b$.

For example, and with reference to FIG. 1, within the cryptographic network $106a$, the computing device $104a$ can generate a partial signature $\sigma_{1,a}$ for a message $M_1$ using $sk_a$ and the computing device $102a$ can generate a partial signature $\sigma_{1,b}$ for the message $M_1$ using $sk_b$. In some examples, a signature function S is used to generate the partial signatures. For example:

$$\sigma_i = S(sk_i, M_1)$$

The partial signatures are combined to provide a signature $\sigma_1$ and can be verified using the shared public key $PK_1$. In some examples, a verification function V can be used. For example:

$$V(PK_1, \sigma_1, M_1)$$

If the verification function returns true, the signature is verified, or returns false, the signature is not verified. Similarly, within the cryptographic network $106b$, the computing device $104a$ can generate a partial signature $\sigma_{2,a}$ for a message $M_2$ using $sk_a$ and the computing device $102a$ can generate a partial signature $\sigma_{2,b}$ for the message $M_2$ using $sk_b$. In some examples, the signature function S is used to generate the partial signatures, which are combined to provide a signature $\sigma_2$ and can be verified using the shared public key $PK_2$. In some examples, the verification function V can be used. For example:

$$V(PK_2, \sigma_2, M_2)$$

If the verification function returns true, the signature is verified, or returns false, the signature is not verified.

Figure 3:
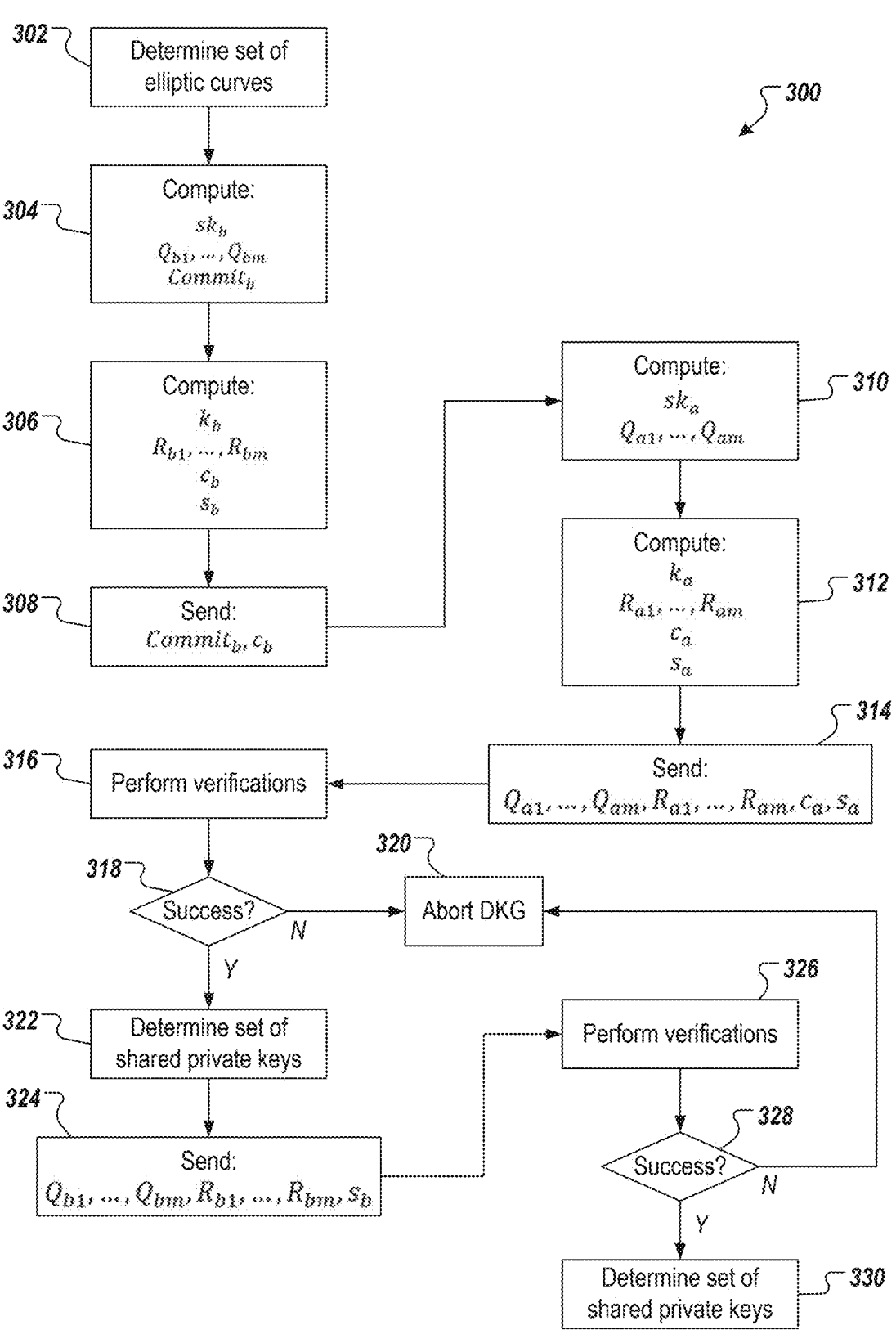
FIG. 3 depicts a flowchart of an example process that can be executed in accordance with implementations of the present disclosure.

FIG. 3 depicts a flowchart of an example process 300 that can be executed in accordance with implementations of the present disclosure. In some examples, the example process 300 is provided using one or more computer-executable programs executed by one or more computing devices.

A set of elliptic curves are determined (302). For example, and as described in detail herein, a user can initiate a universal DKG process with an enterprise. In some examples, the user can indicate two or more cryptographic networks, for which key pairs are to be generated for the user and the enterprise, each cryptographic network having an elliptic curve associated therewith (e.g., secp256k1 for Bitcoin; Ed25519 for Solana). For example, a UI can be provided that enables the user to provide an indication as to which cryptographic networks are to have key pairs generated. In the example use case, the UI can display a superset of cryptocurrencies and the user can select a set of cryptocurrencies from the superset of cryptocurrencies. The set of secure wallets corresponds to the cryptographic networks underlying the set of cryptocurrencies. In some examples, the enterprise provides the UI and can be informed of the set of cryptocurrencies and the underlying elliptic curves.

A first set of parameters is computed (304) and a second set of parameters is computed (306). For example, and as described in detail herein, the second party $P_b$ (the computing device $104a$) executes a first set of computations to provide the first set of parameters and executes a second set of computations to provide the second set of parameters. The first set of parameters includes $sk_b$, $Q_{b1}$, . . . , $Q_{bm}$, and $Commit_b$. The second set of parameters includes $k_b$, $R_{b1}$, . . . , $R_{bm}$, $c_b$, and $s_b$. A sub-set of the first set of parameters and a sub-set of the second set of parameters are sent (308). For example, and as described in detail herein, the second party $P_b$ sends $Commit_b$ and $c_b$ to the first party $P_a$ (the computing device $102a$).

A third set of parameters is computed (310) and a fourth set of parameters is computed (312). For example, and as described in detail herein, in response to receiving $Commit_b$ and $c_b$, the first party $P_a$ (the computing device $102a$) executes a third set of computations to provide the third set of parameters and executes a fourth set of computations to provide the fourth set of parameters. The third set of parameters includes $sk_a$ and $Q_{a1}$, . . . , $Q_{am}$. The fourth set of parameters includes $k_a$, $R_{a1}$, . . . , $R_{am}$, $c_a$, and $s_a$. A sub-set of the third set of parameters and a sub-set of the fourth set of parameters are sent (314). For example, and as described in detail herein, the first party $P_a$ sends $Q_{a1}$, . . . , $Q_{am}$, $R_{a1}$, . . . , $R_{am}$, $c_a$, and $s_a$ to the second party $P_b$.

Verifications are performed (316) and it is determined whether all of the verifications succeeded (318). For example, and as described in detail herein, in response to receiving $Q_{a1}$, . . . , $Q_{am}$, $R_{a1}$, . . . , $R_{am}$, $c_a$, and $s_a$ from the first party $P_a$, the second party $P_b$ executes a fifth set of computations to perform verifications. In some examples, the second party $P_b$ verifies whether:

$$R_{ai} == s_a (\bmod\ n_i) * G_i - c_a (\bmod\ n_i) * Q_{ai}$$

If any verification fails, the DKG process is aborted (320). In some examples, the first party $P_a$ can be informed that the DKG process has been aborted. If all verifications succeed, a set of shared private keys is determined (322). For example, and as described in detail herein, the second party $P_b$ calculates shared public keys $PK_1$, . . . , $PK_m$ for the cryptographic networks, each shared public key corresponding to a respective cryptographic network.

A sub-set of the first set of parameters and a sub-set of the second set of parameters are sent (324). For example, and as described in detail herein, the second party $P_b$ sends $Q_{b1}$, . . . , $Q_{bm}$ and $R_{b1}$, . . . , $R_{bm}$ to the first party $P_a$. In some examples, by receiving $Q_{b1}$, . . . , $Q_{bm}$ and $R_{b1}$, . . . , $R_{bm}$ from the second party $P_b$, the first party $P_a$ is informed that the verifications performed by the second party $P_b$ succeeded. Verifications are performed (326) and it is determined whether all of the verifications succeeded (328). For example, and as described in detail herein, in response to receiving $Q_{b1}$, . . . , $Q_{bm}$ and $R_{b1}$, . . . , $R_{bm}$ from the second party $P_b$, the first party $P_a$ executes a sixth set of computations to perform verifications. In some examples, the first party $P_a$ verifies whether:

$$R_{bi} == s_b (\bmod\ n_i) * G_i - c_b (\bmod\ n_i) * Q_{bi}$$

If any verification fails, the DKG process is aborted (320). In some examples, the second party $P_b$ can be informed that the DKG process has been aborted. If all verifications succeed, a set of shared private keys is determined (332). For example, and as described in detail herein, the first party $P_a$ calculates the shared public keys $PK_1$, . . . , $PK_m$ for the cryptographic networks.

As discussed above, the universal DKG of the present disclosure provides technical improvements over traditional approaches. For example, and with non-limiting reference to the XAX+21 protocol, the universal DKG provides technical improvements in both time- and resource-efficiency. Tables 2-4 provide summaries of technical improvements achieved by the universal DKG of the present disclosure over the XAX+21 protocol:

TABLE 2

| Communication Efficiencies of the Universal DKG | | |
|---|---|---|
| | Communication | |
| | Payload | No. Rounds |
| XAX + 21 DKG | m Commits + 2m Points + 2m Proofs | 3m |
| Universal DKG | 1 Commit + 4m Points + 4 Scalars | 3 |

As represented in Table 2, the universal DKG of the present disclosure provides significantly smaller communication payloads with fewer rounds of communication, resulting in reduced consumption of technical resources. For example, payloads of the universal DKG of the present disclosure are absent NIZK proofs. To quantify the technical efficiencies in terms of payload, a proof is approximately 160 bytes, a scalar is approximately 32 bytes, and a point is approximately 96 bytes. Accordingly, the universal DKG of the present disclosure achieves a reduction in payload of approximately 30%.

TABLE 3

| Computational Efficiencies of the Universal DKG | |
|---|---|
| | Operations |
| XAX + 21 DKG | 2m Random Numbers + m Commitments + 2m Multiplications + 2m Proofs |
| Universal DKG | 4 Random Numbers + 1 Commitments + 8m Multiplications |

As represented in Table 3, the universal DKG of the present disclosure provides significantly fewer computations, resulting in reduced consumption of technical resources. To quantify the technical efficiencies in terms of computation, the universal DKG of the present disclosure achieves a reduction in computation of approximately 20%.

TABLE 4

| Key Efficiencies of the Universal DKG | |
|---|---|
| | Keys |
| XAX + 21 DKG | 2m Private Key Shares m Shared Public Keys |
| Universal DKG | 2 Private Key Shares m Shared Public Keys |

As represented in Table 4, the universal DKG of the present disclosure provides fewer private key shares, resulting in reduced consumption of technical resources and improved security (e.g., a smaller memory footprint for storage and only two private key shares consuming technical infrastructure for security). In terms of security, the universal DKG of the present disclosure reduces attack vectors by a factor of m. That is, only two private key shares need be secured and can be used across all of the m cryptographic networks.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for universal distributed key generation (DKG) between computing devices for cryptographic transactions in multiple cryptographic networks, comprising:

defining a set of elliptic curves comprising two or more elliptic curves corresponding to a set of cryptographic networks, each elliptic curve being associated with a respective cryptographic network;

receiving, by a first computing device, a first sub-set of parameters of a first set of parameters and a second sub-set of parameters of a second set of parameters generated by a second computing device using the set of elliptic curves, the first sub-set of parameters comprising a commitment and the second sub-set of parameters comprising a first verification value;

determining, by the first computing device, a third set of parameters and a fourth set of parameters using the set of elliptic curves;

transmitting, by the first computing device and to the second computing device, a third sub-set of parameters of the third set of parameters and a fourth sub-set of parameters of the fourth set of parameters, the third sub-set of parameters comprising a first set of public key shares and the fourth sub-set of parameters comprising a first set of verification parameters and a set of verification values, the first set of public key shares being generated by the first computing device using a first private key share;

receiving, by the first computing device, a fifth sub-set of parameters of the first set of parameters and a sixth sub-set of parameters of the second set of parameters, the fifth sub-set of parameters comprising a second set of public key shares and the sixth sub-set of parameters comprising a second set of verification parameters and a second verification value, the second set of public key shares being generated by the second computing device using a second private key share; and determining, by the first computing device, a set of shared public keys, the first computing device using the first private key share to generate signatures in any of cryptographic network in the set of cryptographic networks.

2. The computer-implemented method of claim 1, wherein determining, by the first computing device, a set of shared public keys is executed in response to determining that a set of verifications is successful, the set of verifications being executed based on the fifth sub-set of parameters and the sixth sub-set of parameters.

3. The computer-implemented method of claim 2, wherein a verification in the set of verifications comprises calculating, by the first computing device, an expected commitment and comparing the expected commitment to the commitment received from the second computing device.

4. The computer-implemented method of claim 1, wherein the second computing device transmits the fifth sub-set of parameters and the sixth sub-set of parameters in response to determining that a set of verifications is successful, the set of verifications being executed based on the third sub-set of parameters and the fourth sub-set of parameters.

5. The computer-implemented method of claim 1, wherein the second computing device uses the second private key share to generate signatures in any of cryptographic network in the set of cryptographic networks.

6. The computer-implemented method of claim 1, further comprising:

generating, by the first computing device, a first partial signature in a first cryptographic network of the set of cryptographic networks using the first private key share; and generating, by the second computing device, a second partial signature in the first cryptographic network using the second private key share, the first partial signature and the second partial signature being combined within the first cryptographic network to provide a first signature.

7. The computer-implemented method of claim 6, further comprising:

generating, by the first computing device, a third partial signature in a second cryptographic network of the set of cryptographic networks using the first private key share; and generating, by the second computing device, a fourth partial signature in the first cryptographic network using the second private key share, the third partial signature and the fourth partial signature being combined within the second cryptographic network to provide a second signature.

8. The computer-implemented method of claim 1, wherein the commitment is generated as a hash of the second set of public key shares.

9. The computer-implemented method of claim 1, wherein the first verification value is generated as a hash of the second set of public key shares and the second set of verification parameters.

10. The computer-implemented method of claim 1, wherein a verification value of the set of verification values is generated as a hash of the first set of public key shares and the first set of verification parameters.

* * * * *